United States Patent
Pieterse et al.

[11] Patent Number: 6,027,028
[45] Date of Patent: Feb. 22, 2000

[54] CONNECTOR FORMED AS A SLEEVE PUSHED OVER A STANDARD CHIP CARD

[75] Inventors: Rob Pieterse, Aerdenhout; Remco Jack Bernhard Hopman, Wassenaar, both of Netherlands

[73] Assignee: Koninklijke KPN N.V., The Hague, Netherlands

[21] Appl. No.: 08/898,686

[22] Filed: Jul. 22, 1997

[30] Foreign Application Priority Data

Jul. 26, 1996 [NL] Netherlands ............................ 1003693

[51] Int. Cl.[7] .................................................. G06K 19/06
[52] U.S. Cl. ............................ 235/492; 320/111; 439/951
[58] Field of Search ........................... 439/55, 76.1, 500, 439/951, 493; 320/108, 111, 113, 114, 115; 235/492

[56] References Cited

U.S. PATENT DOCUMENTS

| | | | |
|---|---|---|---|
| 3,605,060 | 9/1971 | Praeger | 439/493 |
| 4,980,802 | 12/1990 | Champagne | 235/492 |
| 5,018,051 | 5/1991 | Yamada | 235/492 |
| 5,373,149 | 12/1994 | Rasmussen | 235/492 |
| 5,574,270 | 11/1996 | Steffen | 235/492 |

FOREIGN PATENT DOCUMENTS

| | | |
|---|---|---|
| 0 564 105 | 10/1993 | European Pat. Off. . |
| 0 608 899 | 8/1994 | European Pat. Off. . |
| 195 42 262 | 5/1996 | Germany . |
| WO 96/21900 | 7/1996 | WIPO . |

OTHER PUBLICATIONS

IBM Technical Disclosure Bulletin, vol. 36, No. 09A, p. 167, Sep. 1993.

*Primary Examiner*—Neil Abrams
*Attorney, Agent, or Firm*—Young & Thompson

[57] ABSTRACT

A connector in the shape of a standard printed circuit chip card having contact areas joined by conductors and to be used to apply battery recharging energy to an electronic device such as a mobile telephone through a chip card receiving slot in the device. The connector may be fixed to a power source or may be joined by wires to a remote power source. In some embodiments a sleeve to which the wires are fixed may be placed over a standard chip card. This sleeve may be formed with an opening to expose the chip card contacts so that normal operation may be carried out while batteries are being recharged.

11 Claims, 3 Drawing Sheets

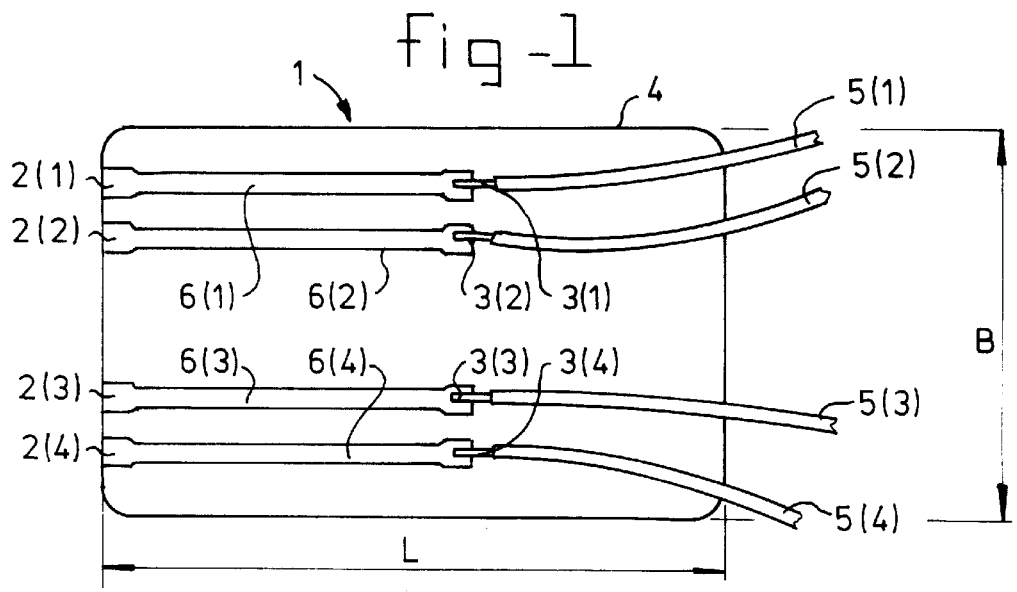
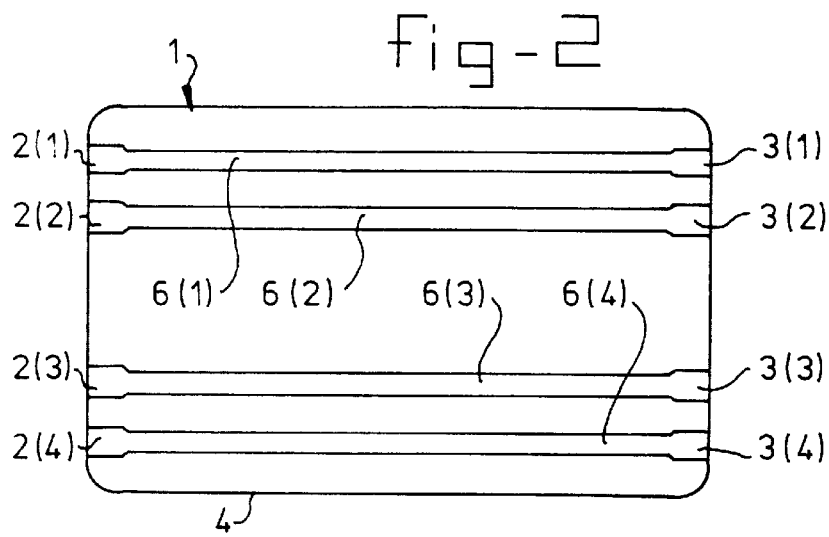
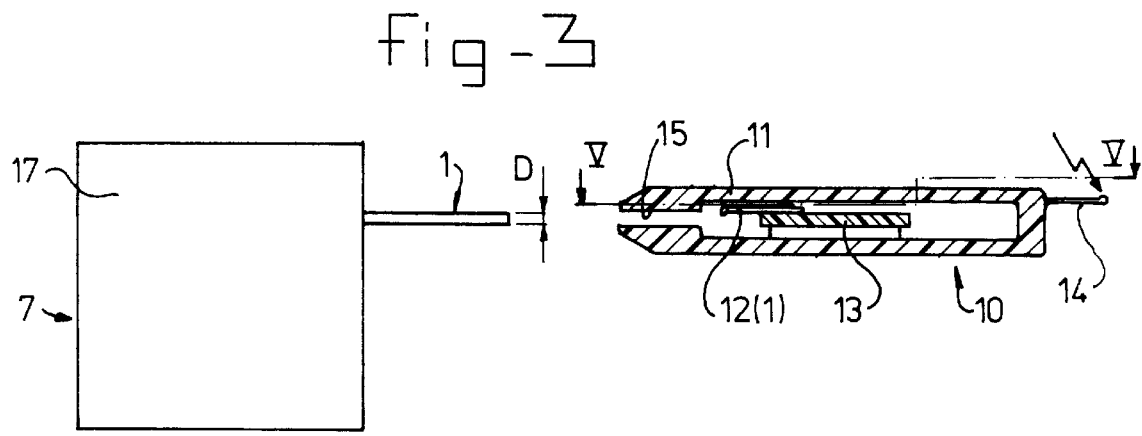

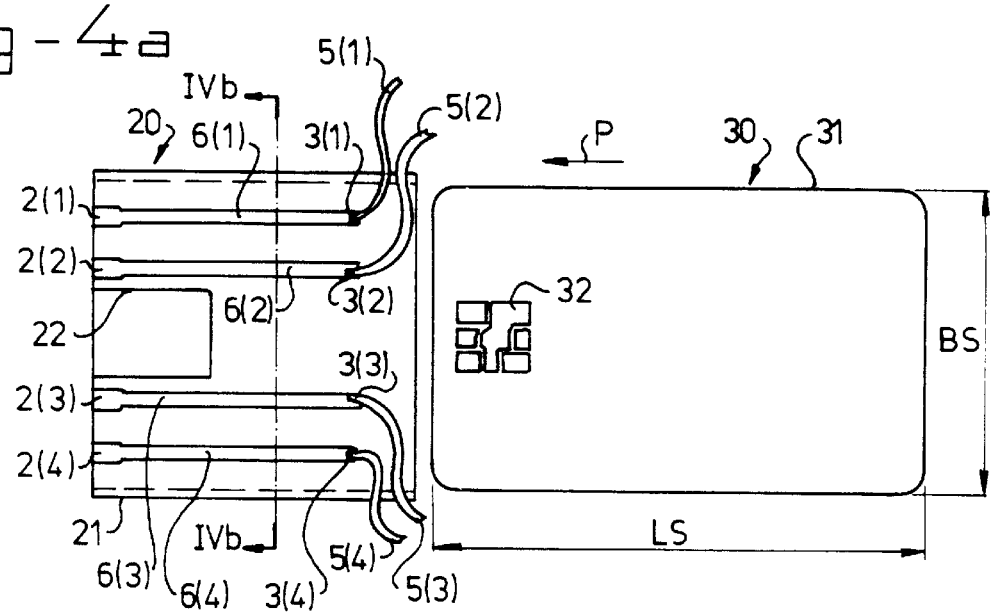
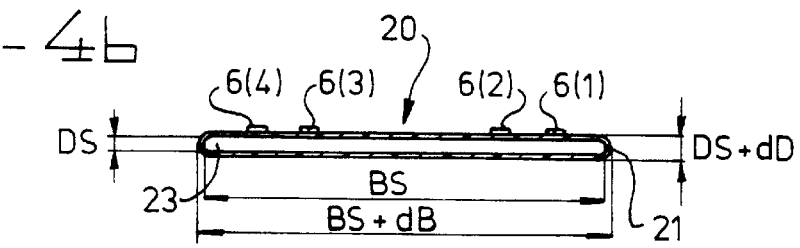
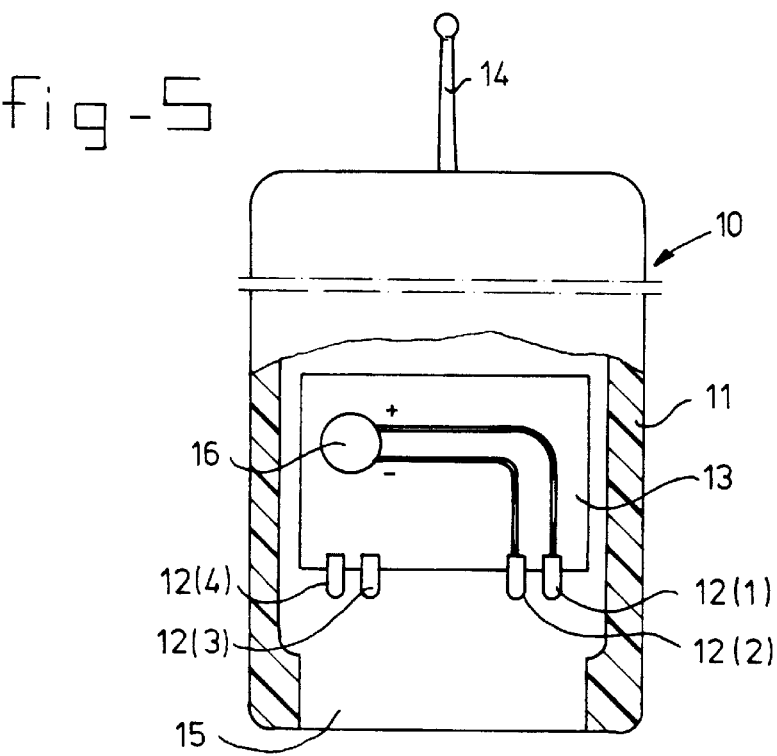

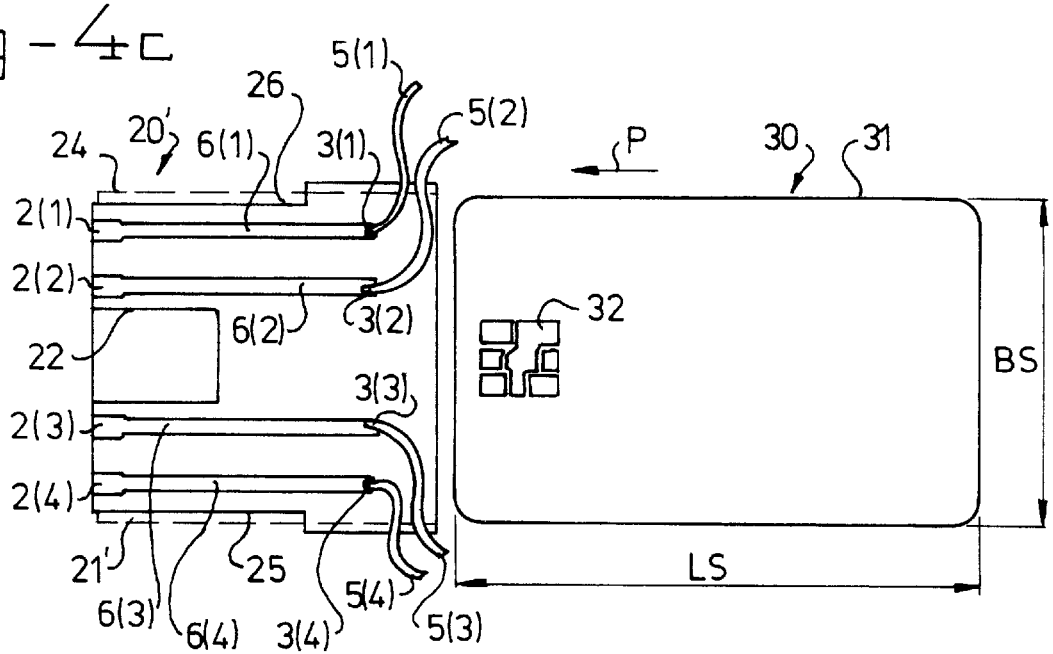

CONNECTOR FORMED AS A SLEEVE PUSHED OVER A STANDARD CHIP CARD

BACKGROUND OF THE INVENTION

The present invention relates to a connector provided with a body of nonconducting material, a first group of contact areas provided on the body, a second group of contact areas provided on the body and a group of electrical conductors for electrically connecting each of the contact areas of the first group to at least one contact area of the second group.

At present, an increasing number of mobile electronic devices is coming onto the market. An example thereof relates to mobile telephones. These devices are often provided with a slot-type cavity into which a chip card having standard dimensions has to be inserted. Electronic "money" can, for example, be stored on such a chip card. Such a chip card may also be provided with a personal identification number (PIN) to check the identification of the user of the device.

Such devices are usually provided with a chargeable battery. In order to charge the battery, the device therefore has to be provided with a connector which is accessible from the outside of the device for supplying electrical energy for recharging the battery. Known connectors are so easily accessible that they can be destroyed either by collision with sharp objects or deliberately with simple tools or the like.

SUMMARY OF THE INVENTION

An object of the present invention is to avoid the use of such an easily accessible connector in an electronic device.

This is possible by providing a specially shaped connector which can interact with the abovementioned connector inside the said electronic device. According to the invention, a connector of the type mentioned at the outset therefore has the characteristic that not only the first group of contact areas, but also the second group of contact areas and the group of electrical conductors are formed as thin-film layers on the body and that the body has, at least underneath the first group of contact areas, the form of a flat substrate whose thickness is equal to the thickness of a standard chip card within the thickness tolerances applying thereto and the width is equal to either the width or the length of a standard chip card within the tolerances applying thereto.

The invention also relates to the use of a connector, the connector being provided with a body of nonconducting material, a first group of contact areas provided on the body, a second group of contact areas provided on the body and a group of electrical conductors for electrically connecting each of the contact areas of the first group to at least one contact area of the second group, not only the first group of contact areas, but also the second group of contact areas and the group of electrical conductors being formed as thin-film layers on the body, and the body having, at least underneath the first group of contact areas, the form of a flat substrate whose thickness is equal to the thickness of a standard chip card within the thickness tolerances applying thereto and the width is equal to either the width or the length of a standard chip card within the tolerances applying thereto, said use being characterized by the following steps:

a. connecting output terminals of a power supply to selected members of said second group of contact areas and connecting selected members of said first group of contact areas, connected with said selected members of said second group of contact areas, to electrical contact terminals of a chargeable battery, and b. providing electrical power with said power supply in order to charge said chargeable battery.

Such a connector can easily be inserted into the already existing cavity of the mobile device, which cavity has hitherto been used solely for inserting chip cards. As a result of providing the contact terminals of the connector of the mobile device itself in the cavity, a separate opening for the last-mentioned connector is no longer necessary. In addition, the cavity itself has a height which corresponds to the thickness of a chip card, as a result of which the cavity is very difficult to access with other objects. The destruction of the connector in the mobile device as a result of accidentally colliding with another object is therefore virtually ruled out. Even the deliberate destruction of the connector using, for example, a screwdriver is virtually impossible.

In another embodiment, the invention relates to a connector provided with a body of nonconducting material, a first group of contact areas provided on the body, a second group of contact areas provided on the body and a group of electrical conductors for electrically connecting each of the contact areas of the first group to at least one contact area of the second group, characterized in that the body has the form of a sleeve having an opening on a side, which opening can be pushed over a chip card having standard dimensions during use substantially in a close-fitting manner and the thickness of the material of the top and bottom of the sleeve together is not more than 0.1 mm.

Such a sleeve can be pushed over a standard chip card, after which such a chip card can be pushed together with the sleeve into the cavity of the mobile device. The thickness of the material of the sleeve is chosen so that it remains within the internationally agreed permissible tolerances for the thickness of a chip card. If the sleeve is made, for example, of plastic, such a thickness can easily be achieved, while it is nevertheless possible to provide the sleeve with adequate rigidity. It is pointed out that, depending on the application, the sleeve can be pushed either over the transverse side or the longitudinal side of a standard chip card.

The present invention furthermore relates to a device, for example a mobile telephone or an interface for converting electrical signals received from a chip card into audible signals for a telephone earpiece (e.g. Tele Chipper®, see e.g. WO-A-96/34483) provided with a casing, contact terminals, a chargeable battery having a positive connection and a negative connection which are respectively connected to a first contact terminal and a second contact terminal for supplying electrical energy to the battery in order to recharge it, and a cavity for receiving a chip card, characterized in that the contact terminals are located in the cavity inside the casing in such a way that at least the first and second contact terminals can be brought into electrically conducting contact with contact areas of the first group of contact areas of a connector as defined above.

By providing such a device with such contact terminals in the cavity which is already provided for receiving a chip card, it is possible to dispense with a further opening for a connector which is used for recharging the chargeable battery.

Finally, the present invention relates to a power supply for providing an electrical supply voltage, which supply is provided with a housing and a connector as defined above, which connector is attached to the housing and at least partially projects from it.

BRIEF DESCRIPTION OF THE DRAWINGS

The invention will be explained in greater detail below by reference to some drawings which are intended only to illustrate it and not to limit the scope of the invention.

FIG. 1 shows a first embodiment of a connector according to the invention;

FIG. 2 shows an alternative embodiment of a connector according to the invention;

FIG. 3 shows a device, for example a supply, on which a connector according to the invention is mounted, and a section through a mobile telephone;

FIG. 4a shows a plan view of a sleeve-type connector according to the invention for interacting with a chip card having standard dimensions;

FIG. 4b shows a cross section of a sleeve-type connector according to FIG. 4a along the line IVb—IVb;

FIG. 4c shows an alternative sleeve-type connector;

FIG. 5 shows diagrammatically a cross section through a partially cut-away view of a mobile telephone along the line V—V in FIG. 3.

DESCRIPTION OF THE PREFERRED EMBODIMENTS

The connector 1 according to the embodiments of FIGS. 1 and 2 takes the form of a flat substrate having the dimensions of a standard chip card, that is to say as defined in ISO 7810 and ISO 7816.

The connector 1 is provided with a first group of contact areas 2(i), where i=1, 2 . . . , on a body 4. In FIG. 1, four such contact areas 2(i) are shown but it will be clear that a greater or lesser number of such contact areas can be provided.

Each of the contact areas 2(i) is connected to a corresponding electrical conductor 6(i). Each of the electrical conductors 6(i) is also connected to a member of a second group of contact areas 3(j), where j=1, 2 . . . The total number of contact areas 2(i) does not have to be equal to the total number of contact areas 3(j). Nor does each of the contact areas 2(i) have to be connected only to one of the contact areas 3(j) as shown. The electrical conductors 6(i) can, if desired, have branches to other contact areas. Contact areas 2(i), 3(j) and conductors 6(i) are formed as thin-film layers on body 4.

In the embodiment according to FIG. 1, each of the contact areas 3(j) is connected to a wire-type conductor 5(k), where k=1, 2, . . . The number of wire-type conductors 5(k) may be equal to the number of contact areas 3(j), but that is not necessary. The wire-type conductors 5(k) can be attached to the contact areas 3(j) for example by means of soldering. Instead of wire-type conductors 5(j), other forms of conductors may also be provided.

FIG. 1 shows that the contact areas 2(i), 3(j) are located on a transverse side. As an alternative, however, they can also be located near a longitudinal side.

FIG. 2 shows an alternative embodiment in which the contact areas 2(i) are provided at one edge of the connector and the contact areas 3(j) are provided at the other edge. Such a connector is suitable as adapter, both the contact areas 2(i) and the contact areas 3(j) being capable of being connected through to connecting terminals of further connectors.

FIG. 3 shows a device 7, for example a power supply having a housing 17 on which a connector 1 according to FIG. 1 or 2 is mounted. The connector 1 projects at least partially out of the device 7, at least to such an extent that it can be inserted to a predetermined depth into a cavity 15 of a device 10 inter-acting therewith and the contact areas 2(i) can be brought into conducting contact with connecting terminals 12(m), where m=1, 2, . . . The device 10 may, for example, be a mobile telephone, having a housing 11 on which an aerial 14 is provided. Within the casing there are a carrier 13, on which the necessary electronic components are provided, and the contact terminals 12(m). Of course, such a mobile telephone is provided with the necessary operating buttons and, possibly, a display on the outside of the casing 11. For the sake of simplicity, however, they are not shown in FIG. 3.

In FIG. 3, the situation is shown that the connector 1 is attached to the housing 17 of the device 7. However, it is to be understood that, as an alternative, the device 7 may comprise a separate housing 17 and a separate connector 1 mutually interconnected by means of suitable electrical connections, like wires. Such a device 7 would provide a user with the possibility of freedom of movement with the connector 1 while keeping the housing stationary.

FIG. 5 shows a cross section of a mobile telephone 10 along the line V—V in FIG. 3. On the carrier 13, there is, inter alia, a chargeable battery 16 (other electrical components are not shown in greater detail for the sake of simplicity). The battery 16 is provided with a positive connection and a negative connection which are each connected via a suitable conductor to a respective contact terminal 12(1) and 12(2). Further possible electronic components, such as a voltage or charge module (not shown), may be provided between the contact terminals 12(1) and 12(2). The contact terminals 12(1) and 12(2) are provided on the carrier 13 in such a way that, if a connector 1 is inserted into the cavity 15, they automatically make electrical contact with, for example, contact areas 2(1) and 2(2) of the connector. As a result, therefore, of providing the contact areas 3(1) and 3(2) with, respectively, a positive supply voltage and a negative supply voltage, the battery 16 can easily be charged. Of course, an alternating voltage may be presented, as an alternative, via contact terminals 12(1) and 12(2) which is converted by means of suitable electronics into a direct voltage for battery 16.

If the connector 1 is situated in the cavity 15, the contact terminals 12(3) and 12(4) will be in electrically conducting contact with the contact areas 2(3) and 2(4) of the connector 1. Via said contact areas 2(3) and 2(4), other voltages can be presented for other electrical components on the carrier 13, for example a reference voltage, for example earth, and a data signal. Of course, more connecting terminals 12(i) can be provided for supplying other voltages. An earth contact terminal, for example 12(4), can be provided, for example, in such a way that it first makes contact with an earth track present on the connector 1, 20, 20' in order to earth the device 10 before a voltage is supplied.

Since the connector 1 usually has to be inserted only partially into a device, such as 10, in such a way that the contact areas 2(i) can make contact with connecting terminals 12(m), the section of the connector 1 which, in the inserted state of the connector 1, remains outside of the housing 11 of the device 10 does not necessarily have to have the same shape as the portion which is indeed inserted into the cavity 15 of the casing 11. That portion of the connector 1 that remains outside the casing 11 may, for example, be thickened or have a structure which is easy to hold in the hand, etc. It is only of importance that the portion of the connector which can be inserted into the cavity 15 of the casing 11 has a substantially constant width B and a substantially constant thickness D which corresponds to the width or thickness, respectively, of a standard chip card. In this connection, the normal dimensional tolerances which have been agreed internationally for chip cards must be observed.

It goes without saying that the length L of the connector 1 does not have to be equal to the length of a standard chip card.

FIGS. 4a and 4b show another embodiment of a connector according to the invention. In the embodiment shown in FIGS. 4a and 4b, the body 21 of the connector 20 takes the form of a sleeve having a cavity 23 which can be pushed over a chip card 30 having standard dimensions in a close-fitting manner. The standard length, standard width and standard thickness of a chip card 30 are indicated by the reference codes LS, BS and DS. The arrow P indicates that the chip card 30 can be pushed into the sleeve 20 in the direction indicated by the arrow P.

The thickness of the material of the sleeve is equal to ½.dD. The total thickness of a connector 20 if a chip card 30 is inserted therein is therefore equal to DS+dD. The dimension dD must be chosen so that the thickness DS+dD falls within the tolerance limits of the internationally agreed thickness for a standard chip card. This can be achieved by making such a sleeve 20 of plastic. According to ISO 7816, the thickness of contact areas or contact tracks provided on chip cards 30 must not be more than 0.100 mm. The total thickness dD of the top and bottom of the sleeve 20 must therefore not be more than substantially 0.1 mm.

The total width BS+dB of the connector 20 must likewise remain within the tolerance limits of the internationally agreed width of a standard chip card. Less stringent requirements are imposed on the length of the sleeve 20 provided only that it projects at least partially out of the device 10 with which the connector 20 has to interact.

It is pointed out that the embodiment shown in FIGS. 4a, 4b has to be pushed over the transverse side of a chip card. As an alternative, the sleeve 20 can be dimensioned in such a way that it can be pushed over the longitudinal side of the chip card 30.

The reference numerals 2(1) . . . 2(4), 3(1) . . . 3(4), 5(1) . . . 5(4), 6(1) . . . 6(4) refer to the same components as in the preceding figures and do not need any further explanation here.

The sleeve 20 may be provided with an opening 22. Said opening 22 is chosen in such a way that if a chip card 30 is inserted in the sleeve 20, the contact areas 32 of the chip card 30 are exposed so that suitable connecting terminals (not shown) of the device 10 can make contact therewith in a manner known per se. The contact areas 32 are provided in a known manner on body 31 of the connector 30.

FIG. 4b reveals that the electrical conductors 6(1) . . . 6(4) are thin layers on the body 21 of the connector 20. Just like the contact areas 2(i) and the contact areas 3(j), they can be formed by any known method for providing thin-film layers on the body 21. This also applies to the embodiments of FIGS. 1 and 2.

FIG. 4c shows an alternative sleeve-type connector 20'. This is partially provided on the longitudinal sides with openings 25, 26 originating from the transverse side on which the contact areas 2(i) are situated. In the case of the transverse side on which the contact areas 3(j) are situated, the top and bottom of the connector 20' are in fact interconnected so that an opening 23 is defined just as in the case of the connector 20 according to FIGS. 4a and 4b. The chip card 30 can again be inserted through said opening 23 in the connector 20' and then assumes the position as indicated by broken line 24. In this case, the width of the entity comprising chip card and connector 20' is exclusively determined in the case of the contact areas 2(i) near the transverse side, by the chip card 30 which projects there outside of the connector 20' so that the total width will not be subject to any hindrance from the sleeve-type connector 20' when the entity is inserted in the device 10. Here again it is also the case that the sleeve-type connector 20' can be dimensioned so that it can be pushed not over the transverse side but the longitudinal side of the chip card 30.

We claim:

1. A connector comprising a body of non-conducting material, a first group of contact areas on the body, a second group of contact areas on the body and a group of electrical conductors electrically connecting each of the contact areas of the first group to at least one contact area of the second group, the first group of contact areas being arranged to apply electrical charging current through a device slot normally used to receive a standard chip card, the body having the form of a sleeve having an opening on a side, which opening can be pushed over the standard chip card in a substantially close-fitting manner, the sleeve having a bottom with a predetermined bottom thickness and a top with a predetermined top thickness.

2. The connector according to claim 1, wherein the sleeve is provided with a second opening for exposing chip-card contact areas of the standard chip card when inserted in the sleeve.

3. The connector according to claim 13, wherein the sleeve is provided with further openings for exposing side edges of the chip card when inserted in the sleeve.

4. The connector according to claim 1, wherein the sleeve comprises plastic.

5. The connector according to claim 1, wherein the bottom thickness and top thickness together is not more than 0.1 mm.

6. A system comprising a device and a connector, the connector comprising a body of non-conducting material, a first group of contact areas on the body, a second group of contact areas on the body and a group of electrical conductors electrically connecting each of the contact areas of the first group to at least one contact area of the second group, the first group of contact areas being arranged to apply electrical charging current through a slot in the device normally used to receive a standard chip card, the body having the form of a sleeve having an opening on a side, which opening can be pushed over the standard chip card in a substantially close-fitting manner, the sleeve having a bottom with a predetermined bottom thickness and a top with a predetermined top thickness; and the device comprising a casing, contact terminals, a chargeable battery having a positive connection and a negative connection which are respectively connected to a first contact terminal and a second contact terminal for supplying electrical energy to the battery in order to recharge it, and the slot for receiving a chip card, wherein the contact terminals are located in the slot so that at least the first and second contact terminals can be brought into electrically conducting contact with the contact areas of the first group of contact areas of the connector when the connector is inserted into the slot.

7. The system according to claim 6, wherein the device is a mobile telephone.

8. The system according to claim 6, wherein the device is an interface for converting electrical signals received from a chip card into audible signals for a telephone earpiece.

9. The system of claim 6, wherein the bottom thickness and top thickness together is not more than 0.1 mm.

10. A power supply having output terminals for supplying power and a connector, the connector comprising a body of non-conducting material, a first group of contact areas on the body, a second group of contact areas on the body and a group of electrical conductors for electrically connecting each of the contact areas of the first group to at least one contact area of the second group, the first group of contact areas being arranged to apply electrical charging current through a device slot normally used to receive a standard chip card, the body having the form of a sleeve having an opening on a side, which opening can be pushed over the standard chip card in a substantially close-fitting manner, the sleeve having a bottom with a predetermined bottom thickness and a top with a predetermined top thickness; and said output terminals of the power supply being electrically connected to members of said second group of contact areas.

11. The power supply of claim 10, wherein the bottom thickness and top thickness together is not more than 0.1 mm.

* * * * *